United States Patent
Solodovnik et al.

(10) Patent No.: US 10,063,077 B2
(45) Date of Patent: Aug. 28, 2018

(54) SYSTEM ARCHITECTURE FOR BATTERY CHARGER

(71) Applicant: The Boeing Company, Chicago, IL (US)

(72) Inventors: Eugene V. Solodovnik, Lake Stevens, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 15/082,810

(22) Filed: Mar. 28, 2016

(65) Prior Publication Data

US 2017/0279287 A1 Sep. 28, 2017

(51) Int. Cl.
*H02J 7/00* (2006.01)
*H02M 7/06* (2006.01)
(Continued)

(52) U.S. Cl.
CPC ......... *H02J 7/0052* (2013.01); *B60L 11/1812* (2013.01); *B60L 11/1814* (2013.01); *B60L 11/1868* (2013.01); *H02J 7/0003* (2013.01); *H02J 7/0013* (2013.01); *H02J 7/0042* (2013.01); *H02J 7/045* (2013.01);
(Continued)

(58) Field of Classification Search
CPC ........ B60M 1/307; B60M 3/06; H02J 7/0052; H02J 7/14; H02J 7/045; H02J 7/042; H02J 7/0003; H02J 2007/0059; B60L 11/1868; B60L 11/1814; B60L 2210/10; B60L 2240/54; H02M 1/4216; H02M 3/33576;
(Continued)

(56) References Cited

U.S. PATENT DOCUMENTS

| 5,266,881 A | 11/1993 | Hoffman et al. |
| 5,570,279 A | 10/1996 | Venkataramanam |

(Continued)

FOREIGN PATENT DOCUMENTS

| EP | 1020973 A1 | 7/2000 |
| EP | 2178189 A1 | 4/2010 |
| EP | 2262087 A1 | 12/2010 |

OTHER PUBLICATIONS

Vieira et al., "Power Converter Topologies for a High-Performance Transformer Rectifier Unit in Aircraft Applications," 2014 11th IEEE/IAS Int'l Conf. on Industry Applications, IEEE, Dec. 7, 2014, pp. 1-8.

(Continued)

*Primary Examiner* — Helen Rossoshek
(74) *Attorney, Agent, or Firm* — Ostrager Chong Flaherty & Broitman P.C.

(57) ABSTRACT

A system architecture for a battery charger that employs GaN-based power devices. The system takes advantage of the active power electronics circuits for power conversion, utilizing controls for power factor correction at its input and constant current/constant voltage regulation at its output. Specifically, a universal GaN-based battery charger architecture is proposed for charging either low- or high-voltage batteries using either three-phase 230-V variable frequency or three-phase 115-V constant frequency AC input power, while meeting stringent power quality and electromagnetic interference aerospace requirements.

19 Claims, 6 Drawing Sheets

(51) Int. Cl.
*H02M 7/217* (2006.01)
*H02M 3/335* (2006.01)
*B60L 11/18* (2006.01)
*H02M 1/42* (2007.01)
*H02J 7/04* (2006.01)
*H02J 7/14* (2006.01)
*H02M 1/00* (2006.01)

(52) U.S. Cl.
CPC ............ *H02J 7/14* (2013.01); *H02M 1/4216* (2013.01); *H02M 3/33546* (2013.01); *H02M 3/33576* (2013.01); *H02M 7/06* (2013.01); *H02M 7/217* (2013.01); *B60L 2210/10* (2013.01); *B60L 2240/54* (2013.01); *B64D 2221/00* (2013.01); *H02J 2007/0059* (2013.01); *H02M 2001/007* (2013.01); *H02M 2001/009* (2013.01); *Y02B 70/126* (2013.01); *Y02B 70/1483* (2013.01)

(58) Field of Classification Search
CPC .. H02M 7/217; H02M 7/06; H02M 2001/007; H02M 2001/009
See application file for complete search history.

(56) References Cited

U.S. PATENT DOCUMENTS

| | | | |
|---|---|---|---|
| 5,574,636 A | 11/1996 | Lee et al. | |
| 5,920,471 A | 7/1999 | Rajagopalan et al. | |
| 6,225,789 B1 | 5/2001 | Yuen | |
| 6,255,744 B1* | 7/2001 | Shih | G06F 1/30 307/64 |
| 6,341,076 B1 | 1/2002 | Kadatskyy et al. | |
| 6,757,185 B2 | 6/2004 | Rojas Romero | |
| 7,053,502 B2* | 5/2006 | Aihara | H02J 9/061 307/46 |
| 7,057,376 B2 | 6/2006 | Cook | B60R 16/03 323/207 |
| 7,633,782 B1 | 12/2009 | Herbert | |
| 7,893,791 B2* | 2/2011 | Ma | H01P 1/15 333/104 |
| 8,058,935 B2* | 11/2011 | Lynch | H01Q 21/0006 331/107 P |
| 8,072,758 B2* | 12/2011 | Groppo | H05K 7/20927 165/104.33 |
| 8,143,862 B2* | 3/2012 | Li | H02J 7/022 320/145 |
| 8,228,690 B2* | 7/2012 | Watanabe | H02J 1/10 307/43 |
| 8,698,354 B2 | 4/2014 | Ghosh et al. | |
| 8,890,477 B2 | 11/2014 | Thommes et al. | |
| 8,891,261 B2 | 11/2014 | Jang et al. | |
| 9,178,354 B2 | 11/2015 | Oleynik et al. | |
| 9,203,307 B2 | 12/2015 | Walters et al. | |
| 9,758,047 B2* | 9/2017 | Hou | B60L 11/1811 |
| 2003/0042404 A1* | 3/2003 | Rice | H01L 31/0304 250/214.1 |
| 2005/0029867 A1* | 2/2005 | Wood | H02J 1/08 307/10.1 |
| 2011/0133560 A1* | 6/2011 | Yamashita | G06F 1/30 307/66 |
| 2011/0148344 A1* | 6/2011 | Manor | H02J 7/0054 320/103 |
| 2011/0199048 A1* | 8/2011 | Yokoyama | H02J 7/045 320/109 |
| 2012/0182769 A1* | 7/2012 | Yonezawa | H02M 1/34 363/21.12 |
| 2013/0162208 A1* | 6/2013 | Ohnuki | B60L 11/1803 320/109 |
| 2013/0215654 A1* | 8/2013 | Yan | H02M 1/14 363/69 |
| 2013/0334879 A1* | 12/2013 | Ido | B60R 16/033 307/10.1 |
| 2015/0035477 A1 | 2/2015 | Wong et al. | |
| 2015/0042159 A1* | 2/2015 | Kim | B60L 11/1811 307/10.1 |
| 2015/0130423 A1 | 5/2015 | Tajima et al. | |
| 2015/0306973 A1* | 10/2015 | Gunnerud | B60L 11/1861 320/162 |
| 2016/0001665 A1* | 1/2016 | Kim | B60L 11/1809 320/109 |
| 2016/0159250 A1* | 6/2016 | Meng | B60M 3/06 191/2 |
| 2016/0165716 A1* | 6/2016 | Ido | H05K 1/0272 361/722 |
| 2016/0236580 A1* | 8/2016 | Hou | B60L 11/1811 |
| 2016/0322861 A1* | 11/2016 | Budde | H02J 7/0052 |
| 2017/0117731 A1* | 4/2017 | Shimada | H02J 7/0052 |

OTHER PUBLICATIONS

Sarlioglu et al., "More Electric Aircraft: Review, Challenges, and Opportunities for Commercial Transport Aircraft," IEEE Trans. on Transportation Electrification, vol. 1, No. 1, Jun. 2015, pp. 54-64.
Extended European Search Report dated Jul. 31, 2017 from European Patent Application No. 17162981.9 (European counterpart of the instant patent application).

* cited by examiner

SYSTEM ARCHITECTURE FOR BATTERY CHARGER

BACKGROUND

This disclosure generally relates to charging devices for batteries and, in particular, relates to charging devices for batteries used on airplanes.

Commercial airplanes utilize batteries of different technologies and corresponding battery chargers. Each charger employs a charging algorithm that corresponds to the particular battery technology and a power conversion architecture that suits the particular input power. In the past, in commercial aviation input power was always 115 V AC and constant 400 Hz frequency, while charger battery output was always between 24 and 32 V DC depending on the low-voltage battery technology used. For example, traditional chargers converting three-phase 115 V AC power to 28 V DC power were used with power conversion efficiencies in a range of 87 to 89%. Insignificant change in charger output voltage and a single standard for input power allowed for reusing legacy charger designs, slightly adjusting the charging logic to meet the particular battery technology.

Recent aerospace industry trends in reducing fuel burn, $CO_2$ emissions and weight and improving overall efficiency have led to the introduction of new higher-voltage input power, which also became variable-frequency (VF) power. In addition, advances in battery technology and industry trends of using higher DC voltages for weight reduction prompted use of high-voltage batteries in many applications (76 V, 270 V, 540 V, etc.). These changes in the industry, coupled with large advances in power electronic devices (e.g., the commercial availability of wide-band gap SiC and GaN-based power switches), make it possible to revisit traditional battery charger designs with the purpose of designing a new universal charger architecture that is lighter and more efficient than traditional charger designs. In addition, for cost efficiency, this charger must be able to utilize any standard aircraft input voltage power (115 V AC, constant frequency or 230 V AC, variable frequency) while charging different batteries, including either traditional (24 and 32 V DC) or more recent high-voltage (200 and 320 V DC) batteries.

In view of the introduction of variable-frequency power, higher voltages, and different battery technologies in more recent airplane architectures, it would be advantageous to design a new universal battery charger that can operate in all common power system architectures and can charge all batteries, either traditional or high voltage.

SUMMARY

The subject matter disclosed in detail below is directed to a light and efficient system architecture for a battery charger that employs gallium nitride-based transistors (hereinafter "GaN-based power switches"). The proposed system takes advantage of the active power electronics circuits for power conversion, utilizing controls for power factor correction at its input and constant current/constant voltage regulation at its output. Specifically, this disclosure proposes a universal GaN-based battery charger architecture for charging either low- or high-voltage batteries from either three-phase 230-V variable frequency or three-phase 115-V 400-Hz constant frequency AC input power, while meeting stringent power quality and electromagnetic interference (EMI) aerospace requirements.

The universal battery charger disclosed herein can operate in all common airplane power system architectures and can charge all batteries, either traditional or high voltage. In addition, the new charger disclosed herein employs wide-bandgap GaN-based power switches that have high-frequency switching capability, which allows for reductions in the size and weight of the filters and transformers.

The solution proposed herein provides enhanced functionality, reduces weight and size of the battery charger, has enhanced efficiency due to the use of GaN-based power switches, and saves cost by virtue of being able to utilize a single common part for different airplane battery architectures. More specifically, the battery charger proposed herein enables weight and size reduction through the use of more advanced power system architectures such as three-phase 230-V AC, VF input power and high-voltage batteries, while being compatible with traditional power system architectures and traditional batteries. The proposed battery charger also improves power conversion efficiency to 95-96% by virtue of using GaN-based power devices. An additional advantage of GaN-based power switches is that they can switch at much higher frequencies than conventional Si devices, which enables significant weight savings for the magnetics used in the charger's input and output EMI filters.

One aspect of the subject matter disclosed in detail below is a battery charger comprising: first and second DC-link conductors; an AC-to-DC rectifier connected to the first and second DC-link conductors and configured to convert AC voltages into a DC-link voltage across the first and second DC-link conductors; and a DC-to-DC converter comprising first and second pairs of output terminals, first and second input terminals connected to the first and second DC-link conductors, a first switch connected to one of the first pair of output terminals, and a second switch connected to one of the second pair of output terminals, wherein the DC-to-DC converter is configured to output DC current for charging a low-voltage battery connected to the first pair of output terminals as a function of the DC-link voltage when the first switch is closed and the second switch is open and is further configured to output DC current for charging a high-voltage battery connected to the second pair of output terminals as a function of the DC-link voltage when the first switch is open and the second switch is closed. In the disclosed embodiments, the DC-to-DC converter is further configured to operate in a resonant converter mode when the first switch is closed and the second switch is open and to operate in a buck converter mode when the first switch is open and the second switch is closed. The AC-to-DC rectifier comprises a Vienna-type boost rectifier. Preferably, both the AC-to-DC rectifier and the DC-to-DC converter comprise a multiplicity of gallium nitride-based transistors.

Another aspect is a battery charger comprising: first and second DC-link conductors; a Vienna-type boost rectifier connected to the first and second DC-link conductors and configured to convert AC voltages into a DC-link voltage across the first and second DC-link conductors; a DC-to-DC converter comprising first and second pairs of output terminals, first and second input terminals connected to the first and second DC-link conductors, a first switch connected to one of the first pair of output terminals, and a second switch connected to one of the second pair of output terminals, wherein the DC-to-DC converter is operable in a resonant converter mode when the first switch is closed and the second switch is open and is operable in a buck converter mode when the first switch is open and the second switch is closed.

A further aspect of the subject matter disclosed in detail below is a DC-to-DC converter comprising: a first pair of output terminals; first and second input terminals; a first switch connected to one of the first pair of output terminals; a multiplicity of power switches connected in series across the first and second input terminals; a first junction connected by respective electrical conductors to a last one of the series-connected power switches, to the second input terminal, and to one of the first pair of output terminals; a second junction disposed along an electrical conductor connecting two of the power switches; a series connection that couples the first and second junctions, the series connection comprising an inductor, a primary winding of a transformer and a first capacitor; a third junction connected by respective electrical conductors to the first capacitor, the first switch and the primary winding of the transformer; and a second capacitor that couples a first output terminal of the first pair of output terminals to a second output terminal of the first pair of output terminals, wherein the first switch is disposed between the third junction and the second output terminal of the first pair of output terminals, and the DC-to-DC converter is configured to operate in a buck converter mode when the first switch is closed. In the embodiments disclosed below, the DC-to-DC converter further comprises: a second pair of output terminals; a fourth junction; a second switch disposed between the fourth junction and a first output terminal of the second pair of output terminals; first and second secondary windings of the transformer connected in series; a first transistor disposed between the first secondary winding and the fourth junction; and a second transistor disposed between the second secondary winding and the fourth junction, wherein the DC-to-DC converter is configured to operate in a resonant converter mode when the first switch is open and the second switch is closed.

Other aspects of a battery charger architecture suitable for charging different types of airplane batteries are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
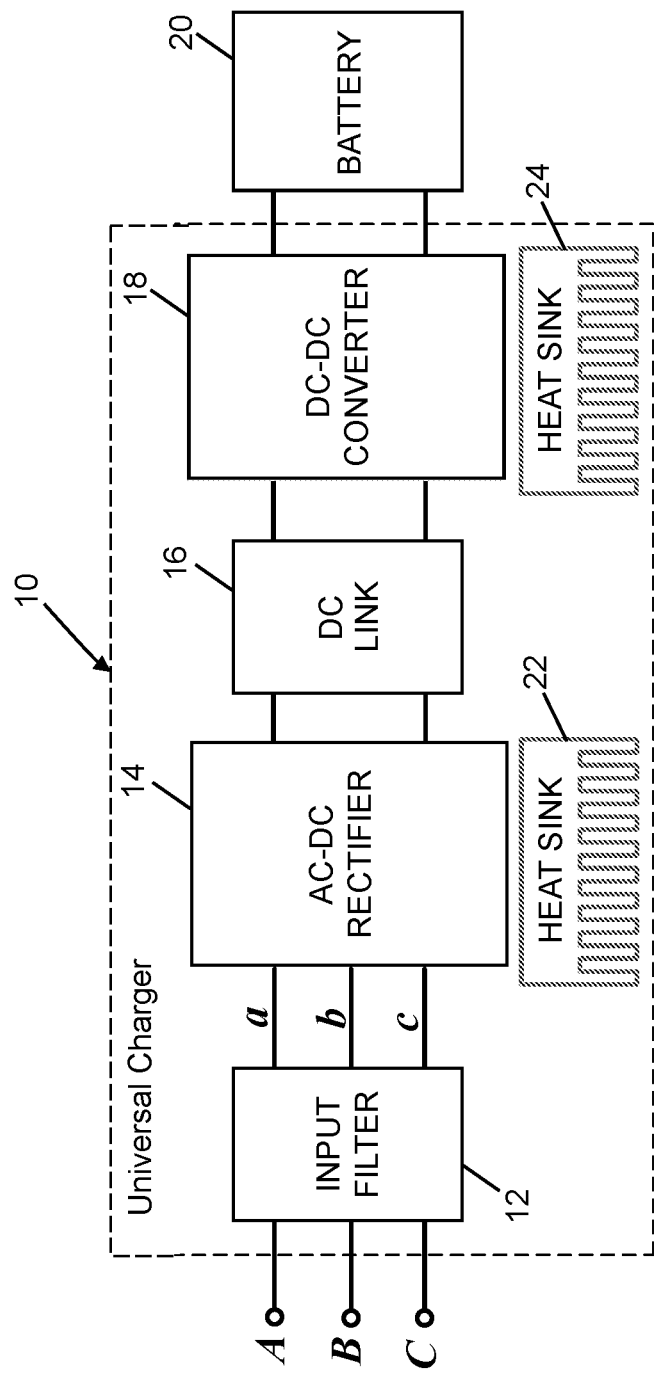
FIG. 1 is a block diagram identifying the main components of a universal battery charger in accordance with one architecture.

Illustrative embodiments of a battery charging system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

This disclosure proposes a system architecture for a universal battery charger suitable for aerospace applications. The proposed battery charger takes advantage of active power electronics circuits and controls to actively regulate the charger's output voltage and current, achieving tight voltage and current regulation to meet battery charging requirements. The proposed universal battery charger can be used with traditional 24-V and 32-V DC batteries or with high-voltage 200-V to 320-V DC batteries. The charger can also be used in traditional airplanes where input power to the charger is three-phase constant frequency 115-V AC, 400 Hz power or in airplane battery architectures where input power to the charger is three-phase 220-V AC to 260-V AC, variable frequency (360 to 800 Hz) power. Such versatility brings commonality among many types of airplanes and enables cost reduction. The charger uses GaN-based power devices that can operate very efficiently at high switching frequency, enabling reduction of the size and weight of the EMI filters. The proposed battery charger meets all aerospace requirements including power quality and EMI.

The architecture proposed herein adopts a two-power-stage approach comprising an active front end and a DC-to-DC converter that provides wide input and output voltage ranges and meets stringent efficiency requirements. More specifically, the proposed two-power-stage topology may be implemented as a three-level AC-to-DC Vienna boost rectifier cascaded with a three-level DC-to-DC converter. In addition, a control scheme is proposed. In accordance with that control scheme, the front-end power stage is utilized to control the charging current by controlling the DC-link voltage. The goal is to vary the DC-link voltage as a function of the load on the battery.

The primary function of a DC-to-DC converter is the transformation of DC voltage and current levels, ideally with 100% efficiency. This function can be represented in a model by an ideal DC transformer. The DC transformer model has an effective turns ratio equal to the quiescent voltage conversion ratio. It obeys all of the usual properties of transformers, except that it can pass dc voltages and currents. Thus the DC-to-DC converter disclosed herein behaves as a DC transformer, operating at the optimal operation point. The voltage gain of the DC-to-DC converter is adjustable to maintain the DC-link voltage above a minimum threshold, under the given voltage variations of the battery. The three-level DC-to-DC converter is modulated with equivalent double-frequency, which achieves lower switching loss and lower passive volume and weight. The term "equivalent double frequency" means that each single power device operates at one specific switching frequency (e.g., 1 MHz), but the transformer to which all switches connect sees a frequency that is twice the operating switching frequency of each individual power device (e.g., 2 MHz). Therefore, due to higher equivalent frequency for the transformer, it can be made smaller, while each individual power device does not have to operate at very high frequency.

The general architecture of a universal battery charger 10 having the above-described two-power-stage topology is presented in FIG. 1. The battery charger 10 comprises: three input terminals which receive respective alternating currents A, B and C of the same frequency and voltage amplitude relative to a common reference but with a phase difference of one third the period; an input filter 12 that filters the alternating currents A, B and C and outputs alternating currents a, b and c designed to help in meeting power quality and EMI requirements; a three-level AC-to-DC Vienna boost rectifier 14 (hereinafter "Vienna boost rectifier 14") that ensures that the battery charger's power factor is close to unity; a DC link 16; and a three-level DC-to-DC converter 18 that regulates the charging voltage and charging current for a battery 20. (The regulated output voltage and the charging current will be respectively represented by parameters $V_{out}$ and $I_{bat}$ in FIG. 6, described below.) The temperature of the Vienna boost rectifier 14 is maintained at a desired level in part due to the conduction of heat into a heat sink 22. Similarly, the temperature of the DC-to-DC converter 18 is maintained at a desired level in part due to the conduction of heat into a heat sink 24.

The structure and operation of a Vienna boost rectifier is well known. A Vienna rectifier is a unidirectional three-phase three-switch three-level pulse-width modulation (PWM) rectifier. It can be viewed as a three-phase diode bridge with an integrated boost converter having a power factor of unity that works as an interface to ensure high energy efficiency by reducing reactive power consumption and supply current harmonics, as well as to maintain a constant DC-bus voltage (hereinafter "DC-link voltage").

Figure 2:
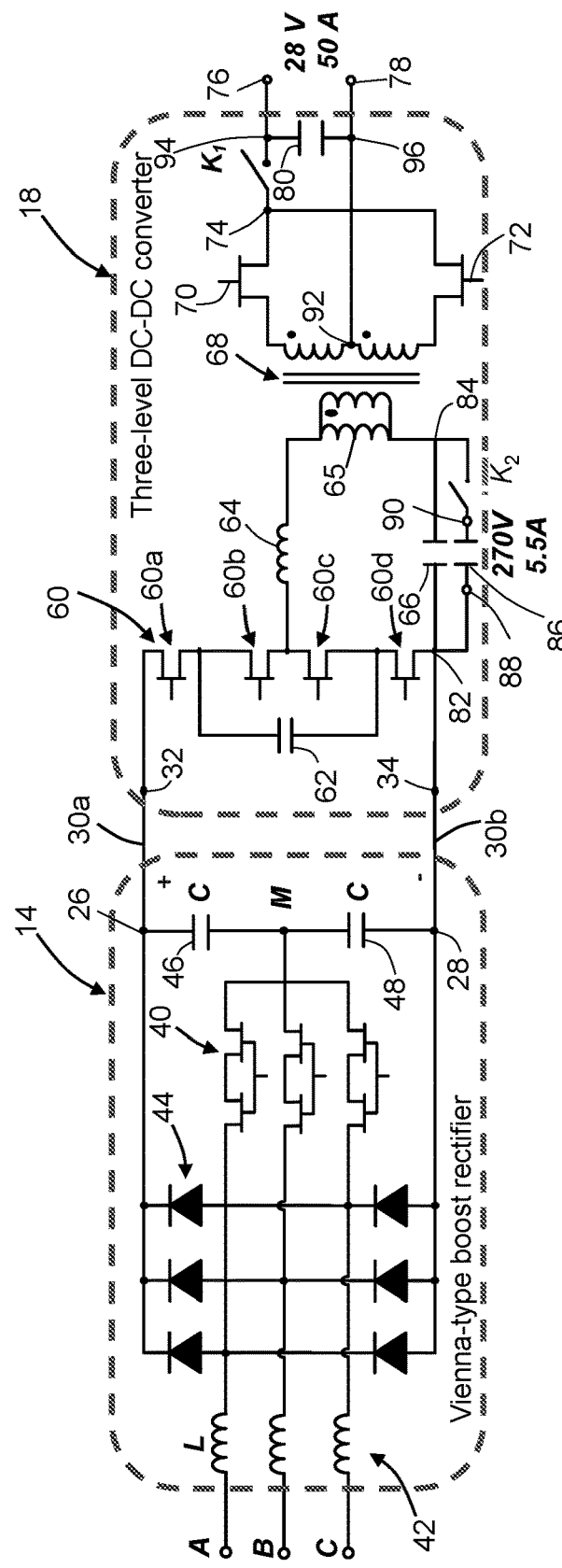
FIG. 2 is a circuit diagram showing a universal GaN-based battery charger circuit topology in accordance with one embodiment.

The circuit topology of a battery charger in accordance with one embodiment having the architecture shown in FIG. 1 is shown at a high level in FIG. 2. The circuitry shown in FIG. 2 was designed to minimize weight and maximize efficiency. The front end of the battery charger depicted in FIG. 2 is a Vienna boost rectifier 14 comprising three input inductors 42, six diodes 44, a switch network 40 consisting of three pairs of GaN-based power switches, and two capacitors 46 and 48, connected as shown in FIG. 2. The back end comprises a DC-to-DC converter 18. The input terminals 32 and 34 of the DC-to-DC converter 18 are respectively connected to the DC-link conductors 30a and 30b, which form the DC link 16 identified in FIG. 1.

As seen in FIG. 2, the DC link 30a connects the input terminal 32 of the DC-to-DC converter 18 to a junction 26 inside the Vienna boost rectifier 14, while the DC link 30b connects the input terminal 34 of the DC-to-DC converter 18 to a junction 28 inside the Vienna boost rectifier 14. The terminals of capacitor 46 are respectively connected to junction 26 and a mid-point node M, while the terminals of capacitor 48 are respectively connected to junction 28 and mid-point node M.

In the embodiment depicted in FIG. 2, each input inductor 42 can be selectively connected to the mid-point node M by means of a respective pair of series-connected GaN-based power switches of switch network 40. Each electrical conductor that connects a respective input inductor 42 to a respective pair of GaN-based power switches of switch network 40 is connected to junctions 26 and 28 by respective diodes 44 as shown in FIG. 2. This three-level topology reduces voltage stress on the GaN-based power switches of switch network 40, allows the input inductors 42 to be reduced in value and size, creates less electromagnetic interference and allows for efficient rectification.

Still referring to FIG. 2, the DC-link conductors 30a and 30b are connected to the input terminals 32 and 34 of a DC-to-DC converter 18. The DC-to-DC converter 18 comprises a switch network 60 consisting of a plurality of high-power (e.g., 600-650 V) GaN-based power switches 60a-60d which are connected in series, one terminal of GaN-based power switch 60a being connected to input terminal 32 and one terminal of GaN-based power switch 60d being connected to input terminal 34 by way of junction 82.

The DC-to-DC converter 18 further comprises a high-frequency transformer 68 that provides DC isolation between the converter input and output when the converter is operated in a resonant converter mode (described later with reference to FIG. 3). In the embodiment depicted in FIG. 2, the transformer 68 has a primary winding and double secondary windings connected in series. A shunt inductor 65 is connected in parallel with the primary winding. One terminal of the primary winding of high-frequency transformer 68 is coupled to a junction between GaN-based power switches 60b and 60c by way of an inductor 64. The other terminal of the primary winding of high-frequency transformer 68 is coupled to a junction 82 by way of junction 84 and a capacitor 66 as seen in FIG. 2. Junctions 82 and 84 are also coupled to each other by way of a switch $K_2$ and a capacitor 86 when switch $K_2$ is closed. A pair of output terminals 88 and 90 are provided for connection to a high-voltage (e.g., 270 V) battery (not shown in FIG. 2). Output terminal 88 is disposed between junction 82 and capacitor 86, while output terminal 90 is disposed between capacitor 86 and switch $K_2$.

The DC-to-DC converter 18 further comprises a pair of output terminals 76 and 78 for connection to a low-voltage (e.g., 28 V) battery (not shown in FIG. 2) and a pair of MOSFET transistors 70 and 72 disposed between a junction 74 and opposing terminals respectively of the series-connected secondary windings of the high-frequency transformer 68. The MOSFET transistors 70 and 72 are controlled such that they synchronously rectify the AC signal on the secondary windings of the transformer 68. A switch $K_1$ is disposed between junction 74 and output terminal 76, while output terminal 78 is connected to a junction 92 disposed between the series-connected secondary windings. In addition, the DC-to-DC converter 18 comprises a capacitor 80 that has one terminal connected to a junction 94 disposed between switch $K_1$ and output terminal 76 and another terminal connected to a junction 96 located between junction 92 and output terminal 78. The capacitor 80 acts as a low-pass filter.

The DC-to-DC converter 18 is reconfigurable through switches $K_1$ and $K_2$. When switch $K_1$ is closed and switch $K_2$ is open, the charger is configured for charging traditional batteries. More specifically, the DC-to-DC converter 18 using the high-frequency transformer 68 to convert the DC-link voltage (i.e., the voltage across the input terminals 32 and 34) into a regulated DC voltage across the output terminals 76 and 78. Conversely, when switch $K_1$ is open and switch $K_2$ is closed, the charger is configured for charging high-voltage batteries. More specifically, the DC-to-DC converter 18 converts the DC-link voltage into a regulated DC voltage across the output terminals 88 and 90 (the high-frequency transformer 68 is not used in this configuration). For example, the DC-to-DC converter 18 is capable of producing a charging current of 50 A for charging a 28-V battery connected to output terminals 76 and 78 when switch K₁ is closed and switch K₂ is open or producing a charging current of 5.5 A for charging a 270-V battery connected to output terminals 88 and 90 when switch K₁ is open and switch K₂ closed.

Figure 3:
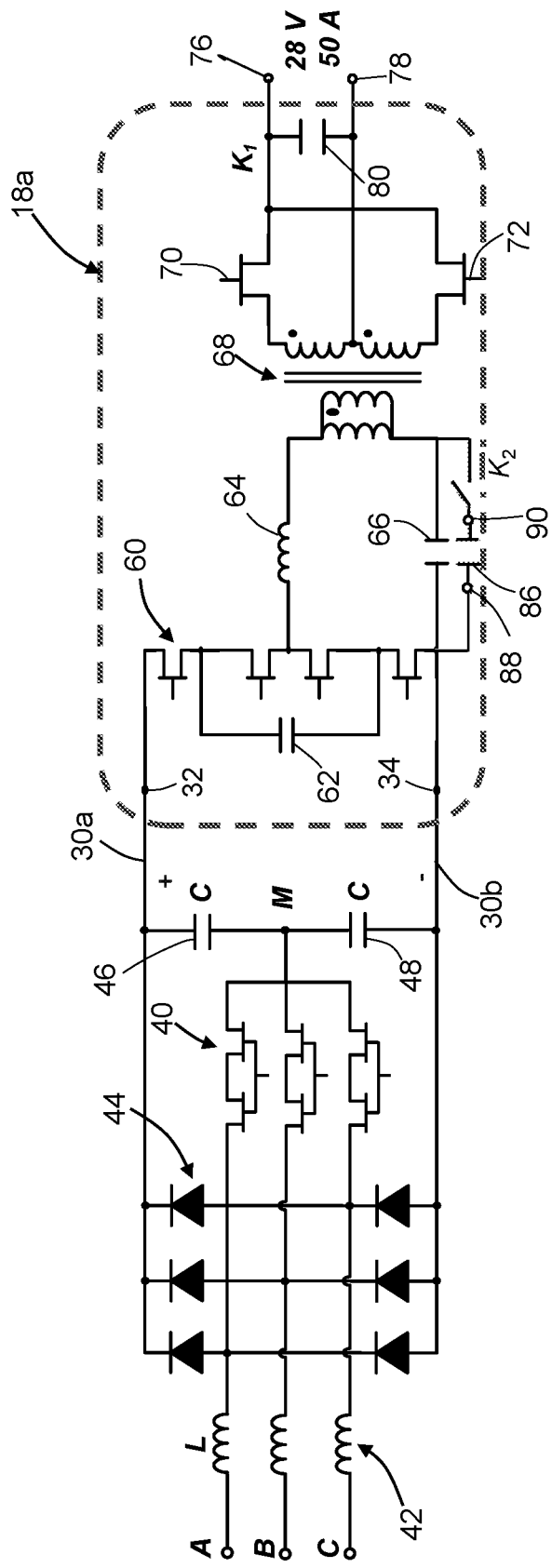
FIG. 3 is a circuit diagram showing the state of the universal GaN-based battery charger circuit topology depicted in FIG. 2 when the battery charger is used to charge traditional 28 V DC batteries.

FIG. 3 is a circuit diagram depicting the battery charger when the configured for 28-V DC/50-A output for charging traditional batteries. In this configuration (i.e., switch K₁ is closed and switch K₂ open), the charger works as a resonant converter 18a, which allows for zero-voltage switching to reduce device switching loss and improve conversion efficiency. Zero-voltage switching also reduces EMI, since each power switch 60a-60d transitions from an ON state to an OFF state or from an OFF state to an ON state when voltage across the switch is zero. In the resonant converter configuration, the high-frequency transformer 68 is necessary due to the large input-to-output voltage ratio. The high-frequency transformer 68 preferably has a planar design (i.e., the windings are printed on a multilayer printed circuit board with the core on top), which reduces its footprint. The secondary winding of the high-frequency transformer 68 provides a high-current output. Therefore, two secondary windings can be utilized to improve efficiency and minimize thermal constraints. The transformer core is selected to minimize core loss at high switching frequency. On the secondary windings of the high-frequency transformer 68, synchronous rectification is utilized to further reduce losses.

The resonant DC-to-DC converter 18a relies on the DC-link voltage to be operational. The DC-link voltage is produced by the boost rectifier 14 from the three-phase AC system. In this way the resonant DC-to-DC converter 18a relies on the three-phase AC voltage.

In resonant converters, a resonant circuit of series-connected inductor 64 and capacitor 66 is used to achieve zero voltage switching of the converter's power devices. Switching power loss (and corresponding inefficiency and heat generation) is produced when the power device transitions from an ON state to an OFF state or vice versa. However, if during ON-OFF transition, the voltage across the device is zero, switching power loss is also zero because power is equal to the product of voltage and current (P=V*I). So, if V=0, then P=0 and there is no switching loss. This is what all resonant converters try to achieve. However, zero voltage switching is an ideal situation. In reality it is not really zero (although much lower than full voltage). Due to converter load variation, the ideal resonant operating point will always move, so the converter will almost never be operating at the ideal operating point. The "ideal" operating of a resonant converter can be widened by utilizing smaller leakage inductance in the transformer primary (by special winding techniques). As a result, the resonant converter operates most of the time in a good, almost ideal resonant condition.

The resonant DC-to-DC converter 18a includes a total of four switches 60a-60d connected to the primary side of the transformer 68. The reason for four switches is because the DC-link voltage is high and a single lateral GaN device may not handle this high voltage. Therefore the DC-to-DC converter 18a has two GaN devices in series per leg, so the whole DC-link voltage is divided among all these devices. Thus, three-level topology is being used on the primary side. When the power devices switch between positive voltage and zero and between zero and negative voltage levels, the voltage stress on the devices is reduced.

In accordance with a further feature, the resonant DC-to-DC converter 18a on the secondary of the transformer 68 uses MOSFET transistors 70 and 72 to perform synchronous rectification. This has an advantage over using diodes in that it is more efficient. Diodes have a p-n junction and as a result they have fixed voltage drop, which results in power loss in the diode. A MOSFET transistor has a channel. This channel does not have a fixed voltage drop, but rather acts as a resistor when the channel is ON. So, if the number of MOSFETs in parallel is increased, it is possible to decrease channel resistance and improve loss compared to regular diodes. This is why synchronous rectification is being used. However, synchronous rectification does require active control of the MOSFET devices, so complexity of the control is greater as compared to use of diodes.

Figure 4:
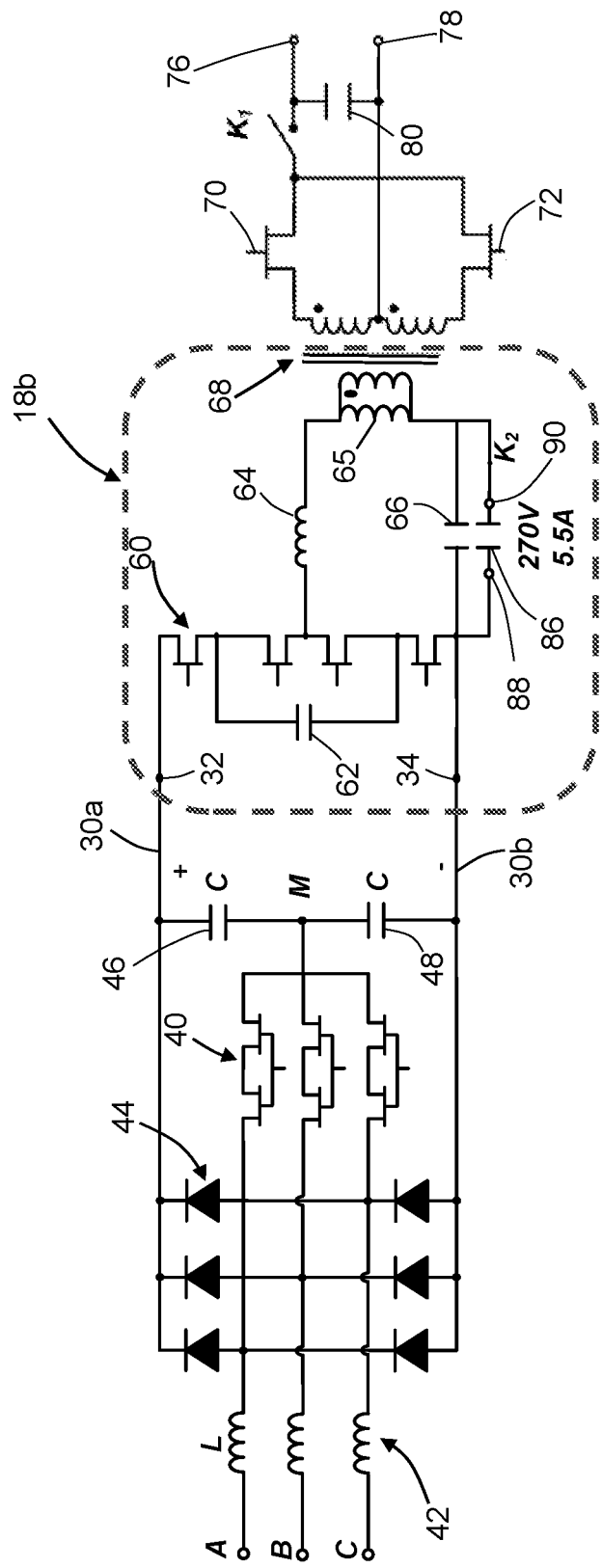
FIG. 4 is a circuit diagram showing the state of the universal GaN-based battery charger circuit topology depicted in FIG. 2 when the battery charger is used to charge high-voltage 270-V DC batteries.

FIG. 4 is a circuit diagram depicting the battery charger when configured for producing a 270-V DC/5.5-A output for charging high-voltage batteries. In this configuration (i.e., switch K₁ is open and switch K₂ closed), the charger works as a buck converter 18b. A buck converter is a voltage step-down and current step-up converter. The buck converter 18b consists of the switch network 60 that is controlled using PWM to reduce the DC component of voltage, and a low-pass filter (i.e., inductor 64 and capacitor 66) that removes the high-frequency switching harmonics The high-frequency transformer 68 is not needed in this case since the input-to-output voltage ratio is not very large.

The buck converter 18b produces a DC output voltage $V_{out}$ whose magnitude is controllable via the duty cycle. The conversion ratio $M_{buck}$ is defined as the ratio of the DC output voltage (i.e., $V_{out}$) to the DC input voltage (i.e., $V_{dc}$) under steady-state conditions. The DC output voltage V is controllable by adjustment of the duty cycle. Since the converter output voltage v(t) is a function of the switch duty cycle, a control scheme can be provided that varies the duty cycle to cause the output voltage to follow a given reference.

Figure 5:
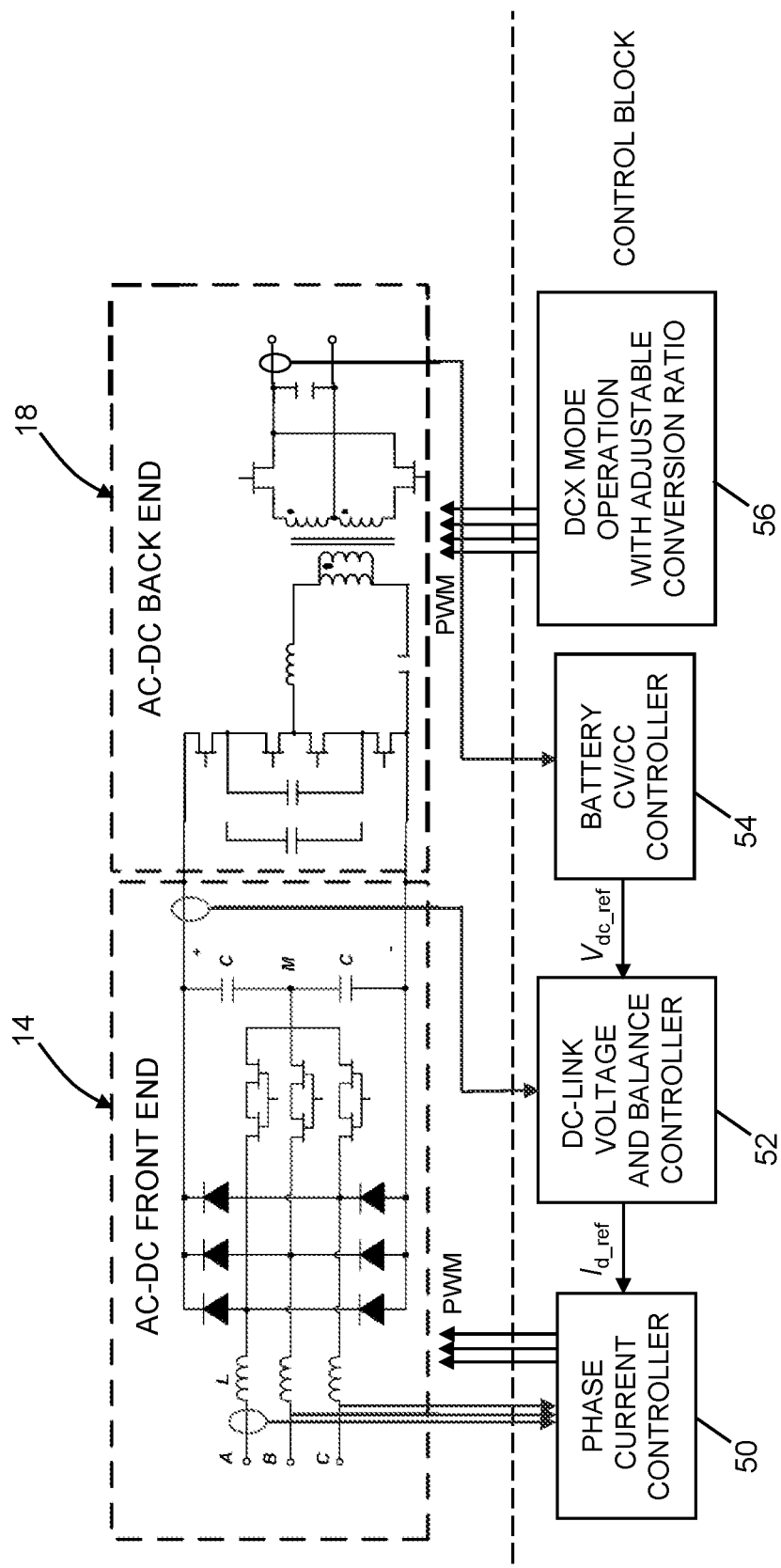
FIG. 5 is a hybrid diagram showing portions of the universal GaN-based battery charger circuit topology depicted in FIG. 2 and blocks representing a control architecture for controlling that GaN-based battery charger circuit in accordance with one embodiment.

FIG. 5 is a hybrid circuit block diagram showing portions of the universal GaN-based battery charger circuit topology depicted in FIG. 2 (the switches K₁ and K₂ are not shown to reduce clutter in the drawing) and blocks representing a control architecture for controlling the battery charger circuit in accordance with one embodiment. The control strategy is as follows.

During charging of a battery, a battery constant voltage (CV)/constant current (CC) controller 54 is configured to prevent overcharging of the battery. Charging takes place intermittently; the charging system is always connected to the battery onboard the airplane. Constant voltage is the charger operating mode when the charger voltage is maintained constant; constant current is the charger operating mode when the charger current is maintained constant. The battery CV/CC controller 54 outputs a reference DC voltage $V_{dc\_ref}$ to a DC-link voltage and balance controller 52. The balance controller 52 maintains mid-point M voltage balance (i.e., the voltages across the top and bottom capacitors 46 and 48 are maintained at the same level). The reference DC voltage $V_{dc\_ref}$ varies as a function of the load requirements. The DC-link voltage and balance controller 52 outputs a reference current $I_{d\_ref}$ to a phase current controller 50, which reference current is a function of the difference between the reference DC voltage $V_{dc\_ref}$ and the DC-link voltage $V_{dc}$ across the input terminals 32 and 34 of the DC-to-DC converter 18. The phase current controller 50 then outputs pulsewidth-modulated (PWM) currents (indicated by arrows PWM in FIG. 5) to transistor gate drivers (not shown) connected to the GaN-based power switches of switch network 40 to force the currents in the three-phase AC load to follow the reference signals. By comparing the command and measured instantaneous values of the phase currents, the phase current controller 50 generates the switching states for the GaN-based power switches of switch network 40 for controlling the DC-link voltage $V_{dc}$. In addition, the front-end stage regulates the charger's input current to implement power factor correction.

Pulse width modulation is a modulation technique that can be used is to control the power supplied to electrical devices. The average value of voltage (and current) fed to the load is controlled by turning the switch between supply and load on and off at a fast rate. The longer the switch is on compared to the off periods, the higher the total power supplied to the load. The term "duty cycle" describes the proportion of ON time to the regular interval or "period" of time; a low duty cycle corresponds to low power, because the power is off for most of the time. The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero.

In accordance with one embodiment of the two-stage battery charger disclosed herein, space vector pulse width modulation (SVPWM) is utilized. Space vector pulse width modulation is a PWM control algorithm for multi-phase AC generation in which the reference signal is sampled regularly; after each sample, non-zero active switching vectors adjacent to the reference vector and one or more of the zero switching vectors are selected for the appropriate fraction of the sampling period in order to synthesize the reference signal as the average of the used vectors.

The DC-to-DC converter 18 operates as a DC transformer (DCX, where X stands for equivalent DC transformer turns ratio (voltage gain)). The state of switch network 60 is controlled by a DCX controller 56 which is programmed in a DCX mode to produce an adjustable voltage conversion ratio that enables the transformer 68 to operate at an optimal operation point. More specifically, the DCX controller 56 outputs PWM currents (indicated by arrows PWM in FIG. 5) to transistor gate drivers (not shown) connected to switches 60a through 60d of switch network 60.

For implementation of the battery charger disclosed herein, GaN-based wide-bandgap devices are used to maximize the advantages of the circuit and control algorithms. For example, fast switching of the GaN-based power switches of switch network 40 allows for size and weight reduction of the input inductors 42 and EMI filters 12 (see FIG. 1). The low switching losses associated with GaN-based power devices enable high efficiency at high switching speed. The GaN-based power switch network 40 is used in a three-level circuit topology, which allows use of a boost circuit that reduces the current level through the input inductors 42 and, therefore, the weight, size and cost of the universal charger. The high switching frequency of the GaN-based power switches of switch network 40 also makes it possible to utilize an active harmonics cancellation technique in a high-power circuit.

Figure 6:
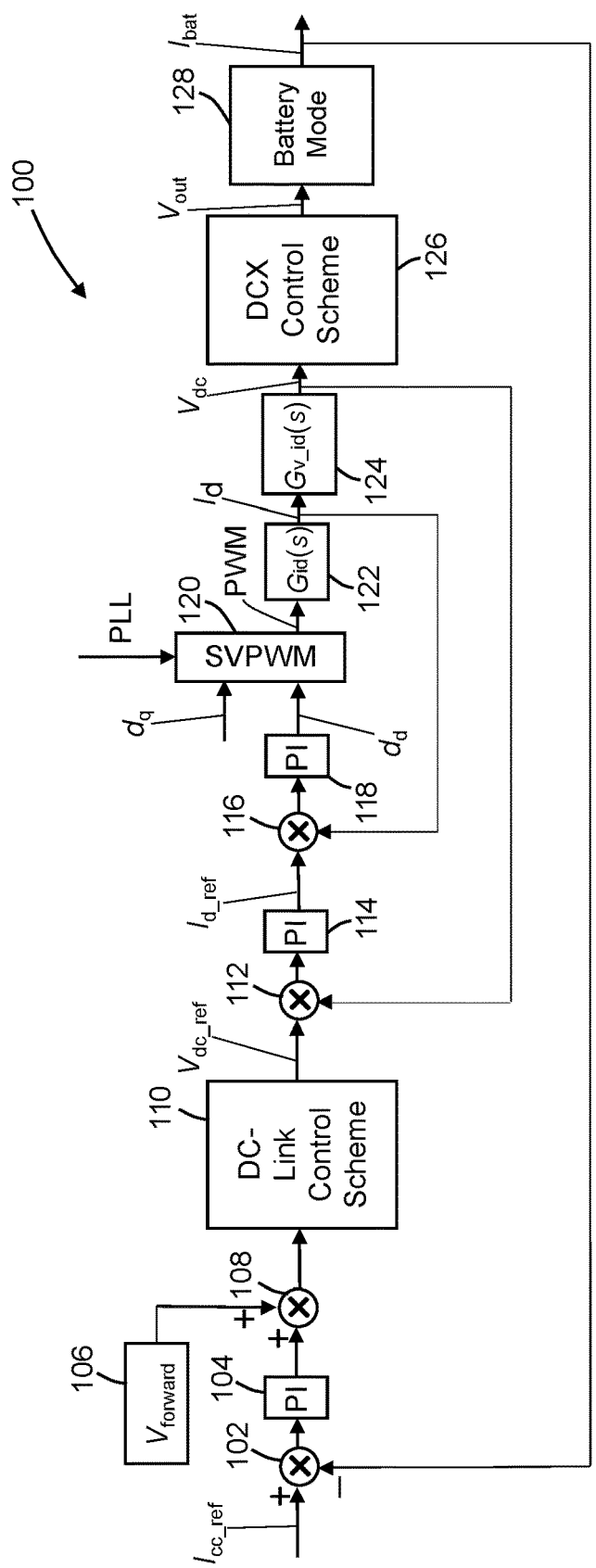
FIG. 6 is a flowchart shows steps of a process for converting three-phase AC power into DC current for charging a battery using the battery charger circuit topology and control architecture depicted in FIG. 5.

FIG. 6 is a flowchart shows steps of a process 100 for converting three-phase AC power into a DC current $I_{bat}$ for charging a battery using the battery charger circuit topology and control architecture depicted in FIG. 5. A first summer 102 inside the battery CV/CC controller 54 (see FIG. 5) forms the sum of the inverse of the battery charging DC current $I_{bat}$ and a reference charging current $I_{cc\_ref}$ which sum is input to a proportional-integral controller 104 that converts the current value to a voltage value. A second summer 108 inside the battery CV/CC controller 54 forms the sum of the output of the proportional-integral controller 104 and an input voltage 106 ($V_{forward}$) of the rectifier that is fed forward to the battery CV/CC controller 54. The output of the second summer 108 is a reference DC voltage $V_{dc\_ref}$ which serves as a reference signal for the DC-link voltage $V_{dc}$ output by the Vienna boost rectifier.

An intermediate DC voltage is input to the DC-link voltage and balance controller 52 (see FIG. 5), which executes a DC-link control scheme 110 to output a reference DC voltage $V_{dc\_ref}$. The DC-link voltage and balance controller 52 comprises a summer 112 that forms the sum of the reference DC voltage $V_{dc\_ref}$ and the DC-link voltage $V_{dc}$, which sum is input to a proportional-integral controller 114 that converts the voltage value to a reference current value $I_{d\_ref}$ that represents the reference d-axis current of the Vienna boost rectifier 14. As seen in FIG. 5, the reference current value $I_{d\_ref}$ is input to the phase current controller 50.

At this juncture, it may be helpful to explain the term "d-axis" and related terminology used below. In electrical engineering, direct-quadrature transformation is a mathematical transformation that rotates the reference frame of a three-phase system in an effort to simplify the analysis of three-phase circuits. In the case of balanced three-phase circuits, application of the direct-quadrature transformation converts the three AC quantities (like voltages and currents) into two DC quantities. Simplified calculations can then be carried out on these DC quantities before performing the inverse transform to recover the actual three-phase AC results. The use of direct-quadrature transformation simplifies calculations for the control of the three-phase inputs to the Vienna boost rectifier. The direct-quadrature transformation is implemented as part of the DC-link voltage and balance controller 52, which converts all sensed AC variables into the direct-quadrature domain in real time. Accordingly, in FIG. 6 $d_d$ is the duty cycle of the d-axis controller; $d_q$ is the duty cycle of the q-axis controller; $I_d$ is the d-axis current; $I_q$ is the q-axis current (equal to zero in the instant application); $G_{i_d}(s)$ is a transfer function that converts d-axis duty cycle PWM into d-axis current; $G_{v\_i_d}(s)$ is a transfer function that converts d-axis current $I_d$ into DC-link voltage $V_{dc}$.

Components of the phase current controller 50, which receives the reference current value $I_{d\_ref}$ from the DC-link voltage and balance controller 52, will now be described with reference to FIG. 6. The phase current controller 50 comprises a summer 116 that forms the sum of the reference current value $I_{d\_ref}$ and the d-axis current $I_d$, which sum is input to a proportional-integral controller 118 that converts the current value to the duty cycle $d_d$. The space vector pulse width modulation (SVPWM) block 120 outputs pulsewidth-modulated (PWM) current to the GaN-based power switches of switch network 40 (see FIG. 1) to force the currents in the three-phase AC load to follow the reference signals. More specifically, the SVPWM block 120 receives the duty cycles $d_d$ and $d_q$ and signals from a phase locked loop (PLL) and creates a duty cycle output that is then fed to the transfer function $G_{i_d}(s)$, which in turn creates the d-axis current $I_d$. In this instance, the q-axis current $I_q$ is set to zero. This is why the q-axis branch (that would be similar to d-axis branch) is not shown in FIG. 6. The duty cycle $d_q$ is set to zero; the q-axis current $I_q$ controls the power factor. If $I_q$ (or $d_q$) is set to zero, a unity power factor can be achieved. The d-axis current $I_d$ is then converted into the DC-link voltage $V_{dc}$ by the transfer function $G_{v\_i_d}(s)$. By comparing the command and measured instantaneous values of the phase currents, the phase current controller 50 generates the switching states for the GaN-based power switches of switch network 40 for controlling the DC-link voltage $V_{dc}$. The DC-link voltage $V_{dc}$ is used by the DCX control scheme 126 of the DC-to-DC converter 18.

The way the controller works is as follows. The DC-to-DC converter 18 works in a constant duty cycle, i.e., it reduces the input DC-link voltage $V_{dc}$ to output battery voltage $V_{out}$ by a fixed ratio. It does not do any control of the battery current $I_{bat}$, which instead is dependent on the battery mode 128, which represents the transfer function of either the constant-voltage mode or the constant-current mode. The charging current that battery needs to be charged at is $I_{cc\_ref}$. This current is controlled by controlling the DC-link voltage $V_{dc}$. The lower the DC-link voltage is, the lower the battery charging current will be. So, based on needed charging current, the reference for the DC-link voltage $V_{dc\_ref}$ is calculated, which is then compared to the actual DC-link voltage $V_{dc}$. The controller adjusts the DC-link voltage output by the Vienna boost rectifier based on battery charging current need and at the same time it maintains unity power factor at the rectifier input by setting the q-axis current to zero.

A control scheme in accordance with one embodiment will now be described for the purpose of illustration. The constraints are as follows: (a) DC output: 28 V/50 A (range: 20-33.6 V) and 270 V/5.5 A (range: 180-302 V); (b) AC input: 115 V or 235 V phase voltage. The nominal condition is as follows: (a) the rectifier controls a flexible DC-link voltage: low limit 606 V, high limit 800V; and (b) the DC-to-DC converter works as a DC transformer with fixed conversion ratio $M_{resonant}$ for the resonant 28-V mode and $M_{buck}$ for the buck 270-V mode.

To facilitate 20 V to 33.6 V variation in the 28-V resonant mode, when the reference DC voltage $V_{dc\_ref} > 606$ V, $M_{resonant}$ is fixed as the nominal value to maintain maximum efficiency for the resonant mode. If the reference DC voltage $V_{dc\_ref}$ is close to 606 V, the voltage conversion ratio $M_{resonant}$ is reduced to prevent the DC-link voltage $V_{dc}$ from dropping. The frequency deviates from its resonance point. The synchronous rectification loss increases slightly.

To facilitate 180 V to 302 V variation in the 270-V buck mode, when the reference DC voltage $V_{dc\_ref} > 606$ V, $M_{buck}$ is fixed as the nominal value to maintain maximum efficiency for the buck mode. If the reference DC voltage $V_{dc\_ref}$ is close to 606 V, the duty cycle in the buck mode is reduced, to keep the DC-link voltage $V_{dc}$ above 606 V.

In summary, a control scheme has been proposed for a two-power-stage battery charger system. The front-end stage is utilized to control the charging current by controlling the DC-link voltage. The DC-to-DC converter stage simply behaves as a DC transformer, operating at the optimal operation point. The voltage gain of the DC-to-DC converter stage is adjustable to maintain the DC-link voltage above the minimum threshold under the given voltage variations of the battery. The three-level DC-to-DC converter in the resonant converter mode is modulated with equivalent double-frequency, which achieves lower switching loss and lower passive volume and weight.

The boost rectifier 14 uses GaN power devices that can switch in the MHz frequency range. This allows for weight and size reduction of the inductors, transformers, and capacitors. However, with MHz frequency switching come many challenges. These challenges are not present with traditional Si power device designs that can switch only tens of kHz. Because turn off and turn on time of the GaN device is very short (in a range of nano-seconds), they can be switched at much higher switching frequencies. This is why it is also possible to greatly reduce switching losses and therefore greatly improve conversion efficiency. The switching loss happens exactly during transition of the device from an ON state to an OFF state and from an OFF state to an ON state. If this transition were to take a long time, the switching loss would be large. The GaN device minimizes switching losses.

One of the challenges posed by high-speed switching is that high dI/dt due to short transition time from an ON state to an OFF state makes mechanical packaging of the hardware very difficult. All parasitic inductances in the device package, i.e., in the printed circuit board, generate very high voltage spikes that can damage the GaN device. This is because V=L*dI/dt. Therefore, with high dI/dt, a high-voltage spike is generated during a transition of the device from ON to OFF. To overcome this, the printed circuit board should be designed to minimize parasitic inductances. Inductance is proportional to length of the trace. So, to minimize inductance, the length of the traces should be minimized, i.e., place gate drivers closer to devices, place the transformer closer to the device, etc. It is challenging to design the PCB layout to be able to fit everything in a very tight package to minimize inductances.

Another unique aspect of the circuitry disclosed herein is that the resulting charger is universal, i.e., able to charge both high-voltage batteries and low-voltage batteries. This dictates reconfigurable circuit topology for the DC-to-DC converter. The topology can reconfigure and switch between buck converter topology and resonant converter topology. Switches $K_1$ and $K_2$ help with that. Reconfiguration can be manual or it can be automatic upon sensing the output voltage of the battery or upon the pin programming, etc.

The software and control scheme are designed to implement high-frequency switching for the GaN devices. With high frequency, everything has to be done much faster. Analog-to-digital and digital-to-analog conversion, calculations and processing of the control signals in the digital signal processor (DSP). It is possible to do with off-the-shelf DSP hardware such as a dual core DSP processor. Also one must pay very close attention to the efficiency of the control code, i.e., write it efficiently, so that it executes fast during one cycle between reading the sensors and outputting control signals to the gate drivers.

Another aspect of the software relates to the "reconfigurability" of the charger. Now, the software needs to be more complex in order to reconfigure switches $K_1$ and $K_2$ depending on either pin programming or on sensed battery voltage level. Another aspect is that the software should be able to adjust PFC controls depending on the charger's input voltage level (it can be 115 V or 230 V).

Another aspect of the charging system disclosed herein is that the DC-to-DC converter can be operated in either an resonant converter mode or a buck converter mode. The universal nature of the circuit will allow for cost reduction for developing of specific charger hardware for each next new airplane. Instead, it will be possible to reuse one universal charger part regardless of battery or operating voltage level.

While a universal battery charger has been has been described with reference to a specific embodiment, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The invention claimed is:

1. A battery charger comprising:
   first and second DC-link conductors;
   a three-phase, three-level AC-to-DC rectifier connected to the first and second DC-link conductors and configured to convert AC voltages into a DC-link voltage across the first and second DC-link conductors;

a three-level DC-to-DC converter comprising first and second pairs of output terminals, first and second input terminals connected to the first and second DC-link conductors, a first switch connected to one of the first pair of output terminals, and a second switch connected to one of the second pair of output terminals; and a controller configured to vary the DC-link voltage as a function of the load on the battery, wherein the DC-to-DC converter is configured to output DC current for charging a battery connected to the first pair of output terminals as a function of the DC-link voltage when the first switch is closed and the second switch is open and is further configured to output DC current for charging a battery connected to the second pair of output terminals as a function of the DC-link voltage when the first switch is open and the second switch is closed; and wherein the controller comprises:

a battery constant voltage/constant current controller configured to prevent overcharging of the battery and output a reference DC voltage that varies as a function of the load requirements;

a DC-link voltage and balance controller configured to receive the reference DC voltage from the battery constant voltage/constant current controller and output a reference current which is a function of the difference between the reference DC voltage and the DC-link voltage; and a phase current controller configured to receive the reference current from the DC-link voltage and balance controller and then output pulsewidth-modulated currents to the AC-to-DC rectifier to force the currents in the three-phase AC load to follow the reference signals.

2. The battery charger as recited in claim 1, wherein the DC-to-DC converter is further configured to operate in a resonant converter mode when the first switch is closed and the second switch is open and to operate in a buck converter mode when the first switch is open and the second switch is closed.

3. The battery charger as recited in claim 1, wherein the DC-to-DC converter further comprises a multiplicity of power switches connected in series across the first and second input terminals.

4. The battery charger as recited in claim 3, wherein the power switches are gallium nitride-based transistors.

5. The battery charger as recited in claim 1, wherein the AC-to-DC rectifier comprises a Vienna-type boost rectifier.

6. The battery charger as recited in claim 1, wherein the AC-to-DC rectifier comprises:

first, second and third input terminals;
a mid-point node;
first and second junctions respectively connected to the first and second DC-link conductors;
a first inductor and a first pair of high-power switches configured to couple the first input terminal to the mid-point node when the first pair of high-power switches are closed;
a second inductor and a second pair of high-power switches configured to couple the second input terminal to the mid-point node when the second pair of high-power switches are closed;
a third inductor and a third pair of high-power switches configured to couple the third input terminal to the mid-point node when the third pair of high-power switches are closed;
a first capacitor having one terminal connected to the mid-point node and another terminal connected to the first junction; and
a second capacitor having one terminal connected to the mid-point node and another terminal connected to the second junction.

7. The battery charger as recited in claim 6, wherein the high-power switches of the first, second and third pairs are gallium nitride-based transistors.

8. A battery charger comprising:
first and second DC-link conductors;
an AC-to-DC rectifier connected to the first and second DC-link conductors and configured to convert AC voltages into a DC-link voltage across the first and second DC-link conductors; and
a DC-to-DC converter comprising first and second pairs of output terminals, first and second input terminals connected to the first and second DC-link conductors, a first switch connected to one of the first pair of output terminals, and a second switch connected to one of the second pair of output terminals,
wherein the DC-to-DC converter is configured to output DC current for charging a battery connected to the first pair of output terminals as a function of the DC-link voltage when the first switch is closed and the second switch is open and is further configured to output DC current for charging a battery connected to the second pair of output terminals as a function of the DC-link voltage when the first switch is open and the second switch is closed,
another of the second pair of output terminals is connected to the second input terminal, and
the DC-to-DC converter further comprises:
first through fourth power switches connected in series across the first and second input terminals;
an inductor connected to a midpoint between the second and third power switches;
a transformer comprising a primary winding and a first secondary winding, the primary winding connecting the inductor to the second switch; and
a first capacitor coupling the primary winding to the fourth power switch.

9. The battery charger as recited in claim 8, wherein the transformer further comprises a second secondary winding connected in series to the first secondary winding, and another of the first pair of output terminals is connected to a midpoint between the first and second secondary windings.

10. The battery charger as recited in claim 9, wherein the DC-to-DC converter further comprises:
a first junction which connects to the one of the first pair of output terminals when the first switch is closed;
a third switch which, when closed, connects the first junction to the first secondary winding; and
a fourth switch which, when closed, connects the first junction to the second secondary winding.

11. The battery charger as recited in claim 10, wherein third and fourth switches are MOSFET transistors.

12. The battery charger as recited in claim 10, wherein the DC-to-DC converter further comprises:
a second junction disposed between the first switch and the one of the first pair of output terminals;
a third junction disposed between another of the first pair of output terminals and the midpoint between the first and second secondary windings; and
a second capacitor disposed between the second and third junctions.

13. A battery charger comprising:
first and second DC-link conductors;
a Vienna-type boost rectifier connected to the first and second DC-link conductors and configured to convert AC voltages into a DC-link voltage across the first and second DC-link conductors;
a three-level DC-to-DC converter comprising first and second pairs of output terminals, first and second input terminals connected to the first and second DC-link conductors, a first switch connected to one of the first pair of output terminals, and a second switch connected to one of the second pair of output terminals,
wherein the three-level DC-to-DC converter is operable in a resonant converter mode when the first switch is closed and the second switch is open and is operable in a buck converter mode when the first switch is open and the second switch is closed; and
a controller configured to vary the DC-link voltage as a function of the load on a battery, wherein the controller comprises:
a battery constant voltage/constant current controller configured to prevent overcharging of the battery and output a reference DC voltage that varies as a function of the load requirements;
a DC-link voltage and balance controller configured to receive the reference DC voltage from the battery constant voltage/constant current controller and output a reference current which is a function of the difference between the reference DC voltage and the DC-link voltage; and
a phase current controller configured to receive the reference current from the DC-link voltage and balance controller and then output pulsewidth-modulated currents to the AC-to-DC rectifier to force the currents in the three-phase AC load to follow the reference signals.

14. The battery charger as recited in claim 13, wherein the DC-to-DC converter further comprises a multiplicity of gallium nitride-based transistors connected in series across the first and second input terminals.

15. The battery charger as recited in claim 13, wherein the Vienna-type boost rectifier comprises:
first, second and third input terminals;
a mid-point node;
first and second junctions respectively connected to the first and second DC-link conductors;
a first inductor and a first pair of high-power switches configured to couple the first input terminal to the mid-point node when the first pair of high-power switches are closed;
a second inductor and a second pair of high-power switches configured to couple the second input terminal to the mid-point node when the second pair of high-power switches are closed;
a third inductor and a third pair of high-power switches configured to couple the third input terminal to the mid-point node when the third pair of high-power switches are closed;
a first capacitor having one terminal connected to the mid-point node and another terminal connected to the first junction; and
a second capacitor having one terminal connected to the mid-point node and another terminal connected to the second junction,
wherein the high-power switches of the first, second and third pairs are gallium nitride-based transistors.

16. A DC-to-DC converter further comprising:
a first pair of output terminals;
first and second input terminals;
a first switch connected to one of the first pair of output terminals;
a multiplicity of power switches connected in series across the first and second input terminals;
a first junction connected by respective electrical conductors to a last one of the series-connected power switches, to the second input terminal, and to one of the first pair of output terminals;
a second junction disposed along an electrical conductor connecting two of the power switches;
a series connection that couples the first and second junctions, the series connection comprising an inductor, a primary winding of a transformer and a first capacitor;
a third junction connected by respective electrical conductors to the first capacitor, the first switch and the primary winding of the transformer; and
a second capacitor that couples a first output terminal of the first pair of output terminals to a second output terminal of the first pair of output terminals,
a second pair of output terminals;
a fourth junction;
a second switch disposed between the fourth junction and a first output terminal of the second pair of output terminals;
first and second secondary windings of the transformer connected in series;
a first transistor disposed between the first secondary winding and the fourth junction; and
a second transistor disposed between the second secondary winding and the fourth junction,
wherein the first switch is disposed between the third junction and the second output terminal of the first pair of output terminals, and the DC-to-DC converter is configured to operate in a buck converter mode when the first switch is closed and the second switch is open and in a resonant converter mode when the first switch is open and the second switch is closed.

17. The DC-to-DC converter as recited in claim 16, wherein the power switches are gallium nitride-based transistors.

18. The DC-to-DC converter as recited in claim 16, wherein a second output terminal of the second pair of output terminals is connected to a midpoint between the first and second secondary windings.

19. The DC-to-DC converter as recited in claim 18, wherein the DC-to-DC converter further comprises:
a fifth junction disposed between the second switch and the first output terminal of the second pair of output terminals;
a sixth junction disposed between the second output terminal of the second pair of output terminals and a midpoint between the first and second secondary windings; and
a third capacitor that couples the fifth junction to the sixth junction.

* * * * *